Jan. 30, 1968    W. R. PETERSON ETAL    3,365,814
JIG BORER SIMULATOR

Filed Sept. 14, 1964    3 Sheets-Sheet 1

INVENTORS
WILLYS R. PETERSON
JOHN C. FREEBURG
BY
McCormick, Paulding & Huber
ATTORNEYS Jan. 30, 1968  W. R. PETERSON ETAL  3,365,814
JIG BORER SIMULATOR
Filed Sept. 14, 1964  3 Sheets-Sheet 2
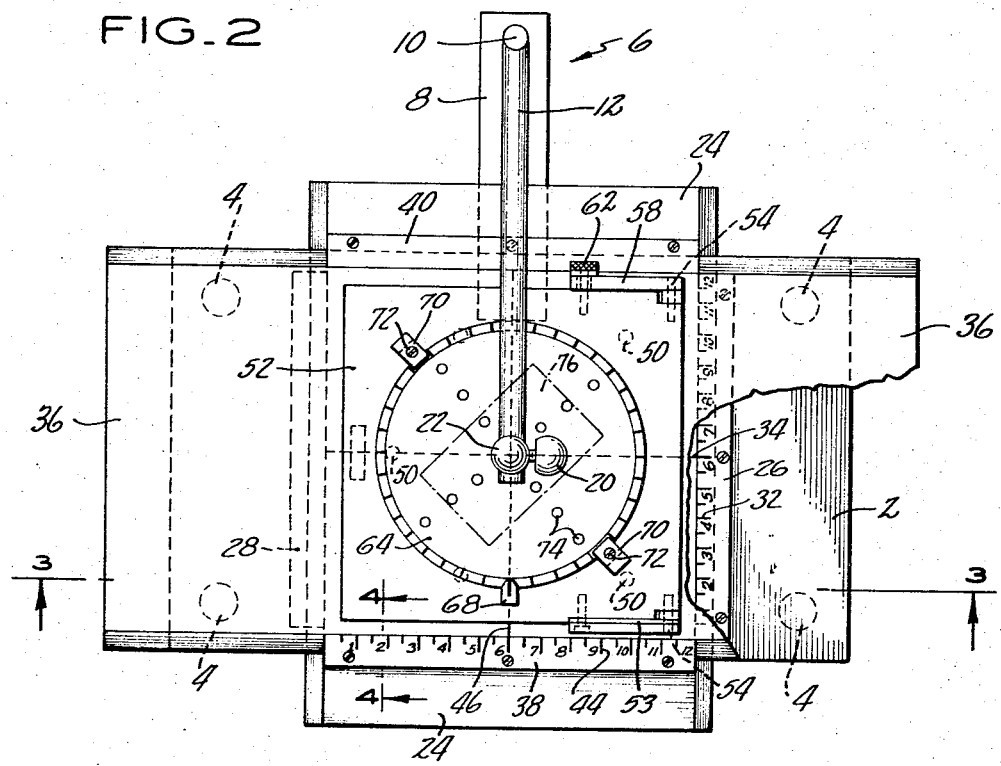
FIG.2
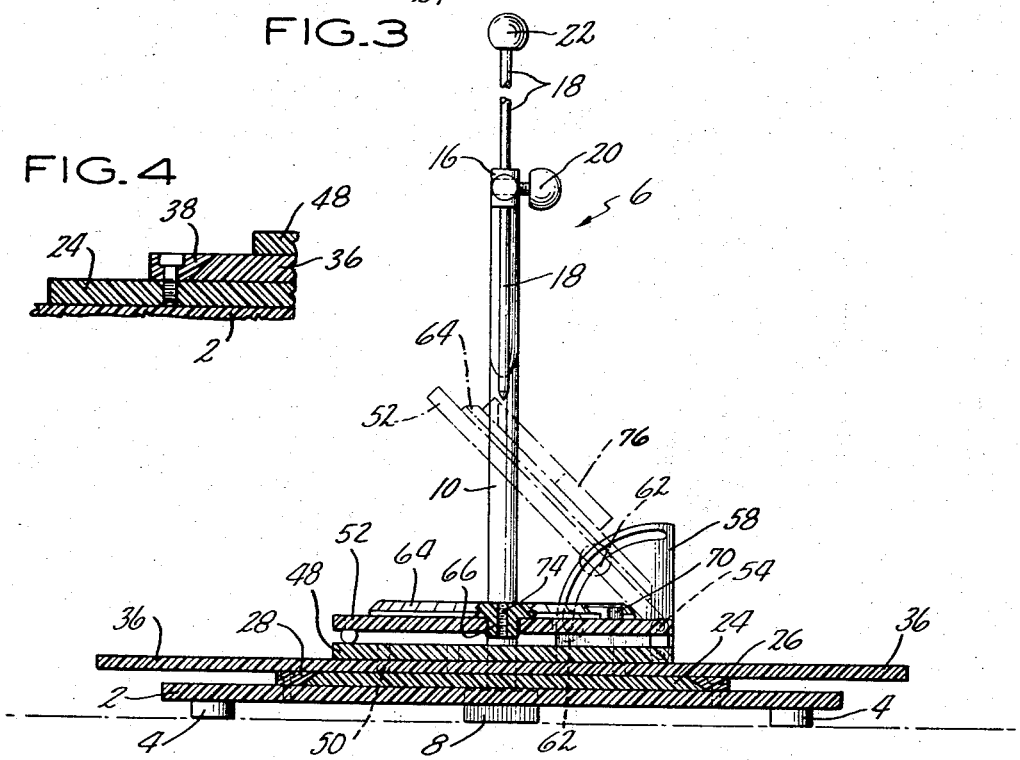
FIG.3
FIG.4

United States Patent Office 3,365,814
Patented Jan. 30, 1968

3,365,814
JIG BORER SIMULATOR
Willys R. Peterson, West Hartford, and John C. Freeburg, Portland, Conn., assignors to United Aircraft Corporation, East Hartford, Conn., a corporation of Delaware
Filed Sept. 14, 1964, Ser. No. 396,152
5 Claims. (Cl. 35—13)

ABSTRACT OF THE DISCLOSURE

A training aid apparatus adapted to be placed on a table or the like for simulating various adjustments required to set up a machine tool and having transparent parts to enable a trainee to visualize better the application of shop mathematics to the solution of machine set-up problems.

This invention relates in general to improvements in training apparatus to be employed in instructing machine operators in the operation of jig borers and other machine tools of the class utilizing rotary tilting table attachments.

The training of new operators for this class of machine has presented difficulty because machine time is usually too costly to be made available for training purposes. Customarily, the trainee receives some on-the-job instruction by a qualified machine operator supplemented by classroom instruction in shop mathematics, however this approach has not proven wholly satisfactory because it necessitates an appreciable amount of costly machine down time and also because the trainee frequently experiences difficulty in visualizing the application of mathematical theory to actual machine set-up problems, particularly where compound angle work is required or where the work piece configuration is complex.

The object of this invention is to provide a training aid apparatus for use in instructing machine operators that is light in weight, portable and inexpensive to construct and which accurately simulates, in a classroom situation, the problems actually encountered in setting up a machine tool of the class described.

A further object of the invention is to provide a training apparatus which will enable a trainee to visualize better the application of shop mathematics to actual machine set-up problems.

Another object of the invention is to provide a training apparatus which will enable a trainee to prove mechanically the accuracy of results obtained through the use of mathematics in the solution of practical machine set-up problems in a classroom situation.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 2 is a plan view of the device partially broken away to show the scale means used to position the transverse table;

FIG. 3 is a vertical sectional view of the device taken as indicated by the line 3—3 of FIG. 2;

FIG. 4 is a fragmentary vertical sectional view taken as indicated by the line 4—4 in FIG. 2.

Figure 1:
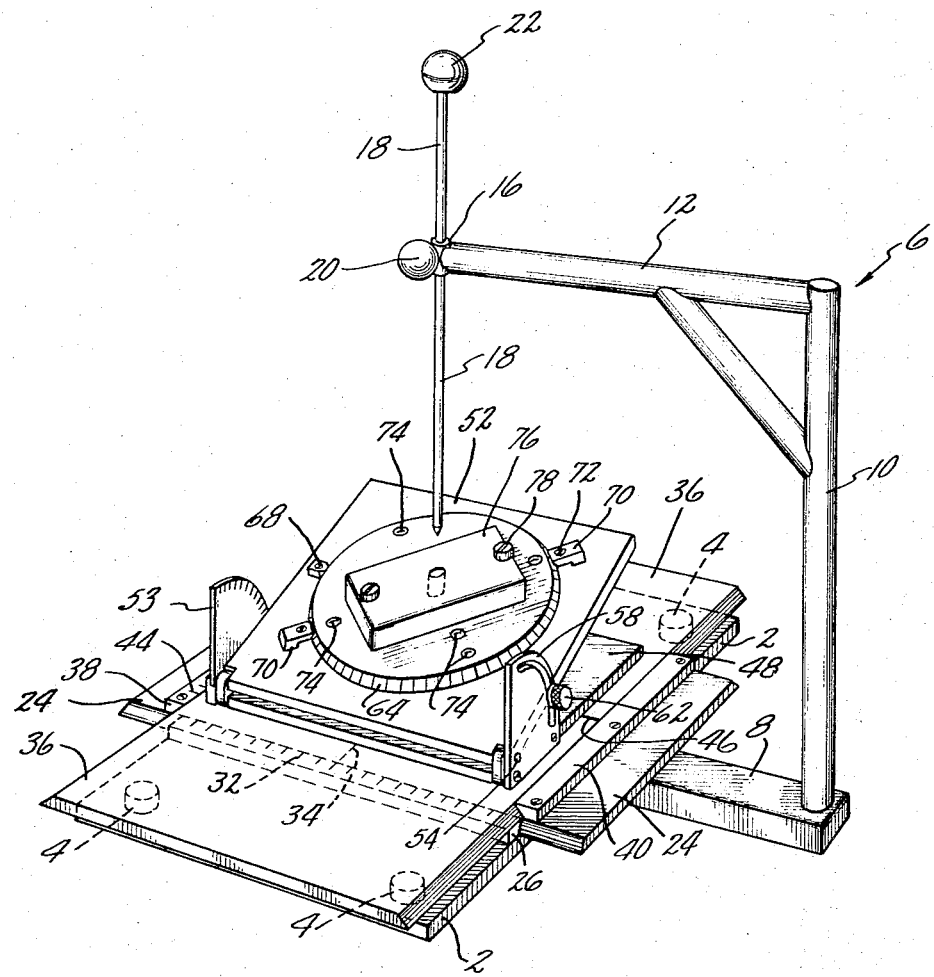
FIG. 1 is a perspective view showing the presently preferred embodiment of the invention.

Referring to FIG. 1 of the drawings, the device includes a substantially horizontal and preferably transparent plastic rectangular base plate 2 having four corner legs 4, 4 for supporting the device on a table or other plane surface. A C-shaped frame assembly 6 is secured to this base plate and comprises a horizontal member 8, which is secured to the underside of the base plate and projects rearwardly therefrom. An upright member 10 extends vertically upwardly from the projecting end of the horizontal member 8, and a horizontal cantilever member 12 projects forwardly over the base plate 2 from the upright member 10. This frame assembly is provided to support a simulated machine spindle, and in this connection a bushing 16 having a vertical bore is mounted in the projecting end of the frame member 12 with its bore axis in alignment with a preselected point on the base plate 2 which is preferably its center. A spindle simulating rod 18, substantially perpendicular to the base plate 2 and axially movable relative thereto, is slidable in the bushing 16 and can be secured in adjusted position by a hand set screw 20. The spindle simulating rod 18 is pointed at its bottom end and has a positioning knob 22 secured to its other or top end.

A preferably plastic and transparent horizontal rectangular plate 24 is slidable forwardly and rearwardly on the base plate 2 in gibs 26 and 28 secured to the top surface of the said base plate. A rectilinear scale 32 having suitable graduations is marked on the gib 26 for positioning or measuring the disposition of the plate 24 relative to the base plate 2 and the spindle simulator rod 18. The middle graduation on the scale 32 lies on the longitudinal or left to right center line of the base plate, and a reference line 34 coincident with the center line of the plate 24 is scribed thereon for positioning the same with reference to said scale as shown in FIG. 2.

A preferably transparent plastic horizontal rectangular plate 36 is positioned on the plate 24 for slidable movement from left to right on gibs 38 and 40 secured to the top of the plate 24. A scale 44 having suitable rectilinear graduations is marked on the gib 38 adjacent to the edge of the longitudinal plate 36 for positioning or measuring the disposition of the plate 36 relative to the base plate 2 and the spindle simulating rod 18. The middle graduation on the scale 44 is coincident with the fore and aft center line of the base plate 2. A reference line 46 is scribed on the supper surface of the plate 36 and coincident with its fore and oft center line for positioning the said plate with reference to the scale 44.

A transparent plastic and horizontal rectangular platform 48 for a tilting plate 52 is held in parallel relationship on the plate 36 by the dowel pins 50, 50. The tilting table or plate 52 is pivotally connected by pivot pins 54, 54 at one edge of the platform 48 on a fore and aft axis, and a protractor quadrant 53, graduated in degrees, is centered on one pivotal connection. The protractor is secured to and extends upwardly from the platform 48 perpendicular to the base plate 2. This protractor is provided for location and/or measurement of the angular disposition of the tilting table or plate 52 in adjusted positions around its pivot axis relative to the horizontal plate of the base 2. A clamping quadrant 58 centered on the other end of the axis of the tilting table 52 extends upwardly perpendicular to the platform 48 and is secured thereto. A binder screw 62 releasably retains the tilting table 52 in selected position relative to the protractor quadrant 53, the said screw being threaded into the said table and projecting through an arcuate slot in the clamping quadrant 58.

A circular disk 64 having a chamfered edge is secured on the tilting plate 52 by a pivot shaft 66 for rotation about its center. The top surface of the disk 64 is circumferentially marked with a suitable circular protractor scale with numerical increments reading both clockwise and counterclockwise. A pointer 68 affixed to the plate 52 in alignment with the fore and aft center line thereof and in contact with and pointing to the protractor scale on the disk 64, serves as a reference point both for positioning and determining the angular disposition of the disk 64 relative to all other aforementioned plates. A pair of diametrically opposed keepers 70, 70 having interior edges in frictional engagement with the chamfered edge of the disk 64 are fastened to the plate 52 by clamping screws 72, 72 for securing the disk 64 in adjusted position. A plurality of tapped mounting holes 74 in the disk 64 axially perpendicular thereto are diametrically disposed on the 0°–180° and 90°–270° axis thereof for mounting work samples as will hereinafter be discussed.

*Operation*

In the following examples illustrating some of the ways in which this device may be employed in training a machine operator, reference is had to drilling operations performed on a jig borer, but it will be understood that this apparatus is not limited to this application and it may be used effectively to train an operator for any machine equipped with a rotary-tilting table attachment. It will also be understood that this training aid may be utilized in training an operator for any machines having a movable table attachment which requires that a work piece be positioned relative to a stationary tool or cutter.

Jig borer operator trainees often experience difficulty in visualizing the practical application of the mathematical concepts involved in compound angular drilling operations. The training apparatus herein disclosed is particularly adapted to the accomplishment of this training objective.

A part to be machined may require that a hole be drilled at an oblique angle to the part base and at an oblique angle to some other datum plane of the part. Such a hole, dimensioned in one plane with one angle and in a second plane with a second angle, is usually referred to as a compound angular hole. The two angles which establish the centerline of the hole in relation to two separate reference planes are usually called the angle of rotation and the angle of tilt.

The object in setting up a part on a rotary-tilt table for the drilling of a hole is to position the table to bring the center line of the hole to be drilled perpendicular to the base of the machine and parallel with the center line of the drill spindle. The rotary-tilt table mechanism on a jig borer is adjustable to both an angle of rotation and an angle of tilt. However, simply rotating the jig borer table to the required angle of rotation and elevating the tilting mechanism to the required angle of tilt as read directly from the part blueprint will not result in positioning the part correctly for machining the hole at the desired compound angle. This is due to the fact that rotating and elevating the part to the given angles creates a resultant compound angle which is the product of these two motions. It is only by the proper application of mathematical formulas that one can establish the correct angle of rotation and the correct angle of tilt necessary for setting the rotary tilt table to achieve the desired result.

After a trainee has completed the mathematical calculations necessary to establish the proper rotary-tilt table settings for a given compound angular drilling problem, the training apparatus may be employed to prove his results. The tilting plate 52 is positioned at the computed angle of tilt with reference to the protractor quadrant 53 and secured in selected position relative thereto by the binder screw 62. The rotary disk 64 is rotated to the computed angle of rotation relative to the pointer 68 and secured in the adjusted position by tightening the clamping screws 72, 72. The resulting settings on the training apparatus correspond to the machine settings required for drilling the problem hole in accordance with the trainee's solution of the problem.

A machined work sample 76 predrilled in accordance with the correct solution to the problem is secured to the rotary disk 64 in a predetermined position relative thereto by holding screws 78, 78 engaging threaded mounting holes 74, 74, as shown in FIG. 1. The spindle simulating rod 18 is axially moved into close proximity to the work sample 76 and secured in adjusted position relative thereto by the hand set screw 20. If the trainee's solution to the problem is the correct one, the spindle simulating rod 18 will be in alignment with the center line of the predrilled hole in the work sample 76.

In like manner, mock up blocks (not shown), or other geometrically shaped visual aids designed to illustrate the angular relationships between the reference planes that determine the center lines of given compound angular holes, may be positioned on this training apparatus in place of the work sample to enable the trainee to visualize better the application of the mathematical concepts to actual compound angle set up problems.

Circular patterns of holes, such as "bolt-circles," drilled in plane surfaces are frequently dimensioned with a radius and the angular spacing from a reference point. A jig borer may be set up with direct reference to such dimensioning and this training apparatus may be employed in the following manner for training an operator to make such a set up.

The disk 64 is horizontally positioned relative to the protractor quadrant 53 and secured by tightening binder screw 62. Plate 24 and plate 36 are moved rectilinearly, as necessary, to align the center of the disk 64 with the axis of the spindle simulating rod 18. A paper work sheet bearing an outline of the work piece surface to be drilled is positioned on the disk 64 with the reference point from which the circular hole pattern is dimensioned in alignment with the axis of the spindle simulating rod 18 and with the line from which the angular spacing is referenced parallel to a center line of the plate 36. Assuming that the reference line from which the angular hole spacing is dimensioned has been aligned with the longitudinal or left to right center line of the plate 36, the plate 36 is moved longitudinally with reference to the scale 42 through a distance equal to the radius dimension of the given hole pattern. The disk 64 is rotated with reference to the fixed pointer 68 through an arc equal to the central angle dimension for the given hole spacing problem. The spindle simulating rod 18 is then moved axially downwardly until the point at its bottom end makes a prick mark on the paper work sheet. This prick mark represents the center of the hole so located. By successively positioning the disk 64 for each central angle dimension and marking each hole center so established with the spindle simulating rod 18, a hole pattern corresponding to the problem hole pattern will be marked on the work sheet.

If the machine tool to be employed on the aforestated circular pattern drilling problem is not equipped with a rotary table to permit direct angular spacing, it is necessary for the trainee to convert trigonometrically the radius and the angular dimensions to rectilinear coordinate dimensions. The results of these mathematical calcluations may also be proven on this training device.

Figure 5:
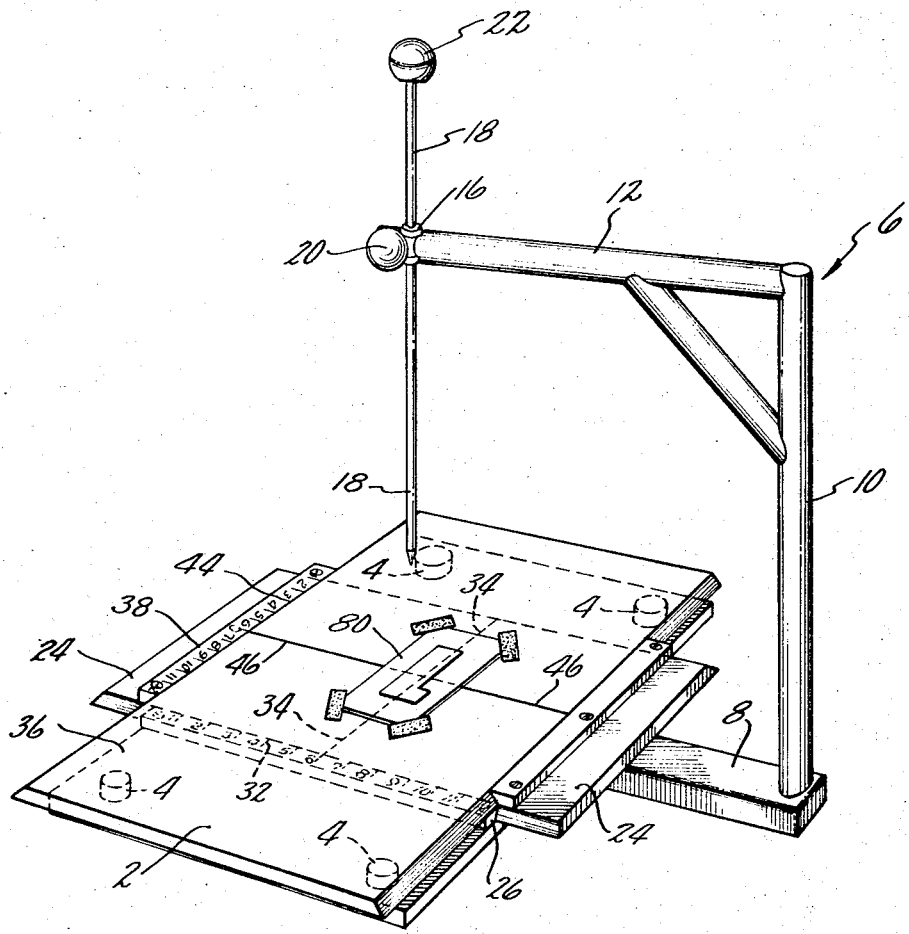
FIG. 5 is a perspective view showing the device set up for a simple hole spacing problem.

The tilting and rotary mechanisms which includes the platform 48 and its appurtenant tilting plate 52 and disk 64 can be removed from the training apparatus by lifting the platform 48 vertically until the dowel pins 50, 50, secured thereto, clear their respective alignment holes in the plate 36. A paper work sheet 80 bearing an outline of the work surface to be drilled is positioned on and suitably secured to the plate 36 with the reference lines on work surface from which the calculated rectilinear coordinate dimensions are referenced parallel to the center lines of the plate 36, as shown in FIG. 5. In this plane surface circular hole spacing problem, one rectilinear coordinate reference line will be the base line from which the central angle dimension is given. The other will be a line perpendicular to this base line and passing through the center of the given central angle. The plate 36 is moved, as necessary, to bring the reference line on the work surface from which the longitudinal coordinate dimensions are referenced into alignment with the spindle simulating rod 18. The position of the reference line 46 relative to the scale 44 is noted. The plate 36 is moved longitudinally in the direction of and through a distance equal to the longitudinal coordinate dimension of a hole location. The plate 24 is moved transversely, as necessary, to position the reference line on the part surface from which the transverse coordinate dimensions are referenced into alignment with the spindle simulating rod 18. The position of the reference line 36 relative to the scale 32 is noted. The plate 24 is moved transversely in the direction of and through a distance equal to the transverse coordinate dimension for the selected hole. The spindle simulating rod 18 is now employed to prick the surface of the paper, the resulting prick mark indicating the location of the required hole center. In like manner, the remaining centers may be located.

It becomes apparent from the foregoing illustration that this apparatus may also be used to train a machine operator to set up a machine equipped with a movable table attachment where rectilinear coordinate woring dimensions are given.

The invention claimed is:

1. A training aid apparatus for use in the training of operators of jig borers and similar machines, said apparatus comprising an elongated rod supported for axial movement to simulate axial movement of a machine spindle, a flat disk, a base adapted to rest on a table surface or the like and supporting said disk for longitudinal and transverse movement in a plane perpendicular to said rod, a first reference means for selectively locating said disk in adjusted positions of the base, means supporting said disk for pivotal movement relative to said base on an axis parallel to one of the said longitudinal and transverse directions of movement, a second reference means for selectively locating said disk supporting means in pivotally adjusted positions, means for rotating said disk on an axis through its center and perpendicular to it, a third reference means for selectively locating said disk in rotated positions, a work sample having a pre-bored opening which will receive an end of said rod in a smooth sliding fit, and means for securing said work sample to said disk in only one predetermined position to effect axial alignment between said rod and said pre-bored opening when said mounting disk is selectively positioned in accordance with the correct solution of a problem calling for location and boring of a similar opening in an actual workpiece.

2. A training aid apparatus as set forth in claim 1 wherein said base includes a first plate supported for transverse movement in a plane perpendicular to said rod and a second plate supported for movement with said first plate and for longitudinal movement relative thereto and in a plane perpendicular to said rod.

3. A training aid apparatus as set forth in claim 2 wherein said disk is supported on said second plate and wherein said disk axis is parallel to said transverse direction.

4. A training aid apparatus as set forth in claim 2 wherein said second plate is transparent and supported above said first plate and wherein said reference means includes a scale positioned generally adjacent said first plate and secured against transverse movement relative to said rod, said scale being visible through said second plate.

5. A training apparatus as set forth in claim 1 wherein said disk has a plurality of threaded openings therein, said work sample having a plurality of holes therethrough, each of said holes being aligned with an associated one of said threaded openings when said work sample is in said one predetermined position, and wherein said means for securing said work sample to said disk comprises a plurality of threaded fasteners, each of said fasteners extending through an associated one of said holes and threadably engaging an associated one of said disk openings.

References Cited
UNITED STATES PATENTS

| | | | |
|---|---|---|---|
| 895,093 | 8/1908 | Knight | 90—52 |
| 1,207,717 | 12/1916 | Dartt | 77—62 |
| 1,396,302 | 9/1921 | Wagner | 77—62 |
| 1,414,970 | 5/1922 | Nelson | 269—71 |
| 3,145,476 | 8/1964 | Hester | 33—76 |
| 3,176,548 | 4/1965 | Leerkamp | 77—62 |

EUGENE R. CAPOZIO, *Primary Examiner.*

W. NIELSEN, *Assistant Examiner.*